United States Patent [19]

Dahlstrom et al.

[11] 4,101,906

[45] Jul. 18, 1978

[54] CHARGE ELECTRODE ASSEMBLY FOR INK JET PRINTER

[75] Inventors: Mark Sorensen Dahlstrom, San Juan Bautista; Paul Simon, Palo Alto, both of Calif.

[73] Assignee: International Business Machines Corporation, Armonk, N.Y.

[21] Appl. No.: 790,205

[22] Filed: Apr. 25, 1977

[51] Int. Cl.[2] ............ G01D 15/18

[52] U.S. Cl. ............ 346/75

[58] Field of Search ............ 346/75

[56] References Cited

U.S. PATENT DOCUMENTS

| | | | |
|---|---|---|---|
| 3,117,023 | 1/1964 | Tirrell | 117/227 |
| 3,397,345 | 8/1968 | Dunlavey | 346/75 UX |
| 3,701,724 | 10/1972 | Entwisle et al. | 204/290 F |
| 3,711,385 | 1/1973 | Beer | 204/59 |
| 3,790,953 | 2/1974 | Sugiya | 346/75 |
| 3,975,741 | 8/1976 | Solyst | 346/75 |
| 4,023,180 | 5/1977 | Zenner | 346/75 |

OTHER PUBLICATIONS

Giordano, F. P., Selective Masking for Charge Electrode Structures Used in Ink Jet Printing, IBM Tech. Discl. Bull., vol. 18, No. 10, Mar. 1976, p. 3476.

*Primary Examiner*—George H. Miller, Jr.
*Attorney, Agent, or Firm*—Nathan N. Kallman

[57] ABSTRACT

A charge electrode assembly useful in an ink jet printer comprises a nonconductive supporting structure in which a multiplicity of grooves are formed. Each groove has a conductive layer of a corrosion-resistant noble metal, preferably platinum or rhodium, thereby forming an electrode. An electric power supply is coupled to the electrodes and energizes selected ones of the electrodes when propelled ink droplets traverse the electrode area.

7 Claims, 3 Drawing Figures

CHARGE ELECTRODE ASSEMBLY FOR INK JET PRINTER

BACKGROUND OF THE INVENTION

Some presently known ink jet printers employ a multiplicity of charge electrodes for controlling or modulating the stream of ink that is directed from an ink source to a record medium. An example of this type of printer is described in U.S. Pat. No. 3,373,437 entitled "Fluid Droplet Recorder With A Plurality of Jets", issued Mar. 12, 1968. One significant problem that has been encountered in arrangements of this type is the corrosion of the electrode material caused by anodic and cathodic dissolution.

Another problem that is experienced is that a charge electrode which has an adhesion layer of transition metal under the functional coating tends to fail when used under cathodic current conditions because hydrogen is evolved, causing spalling and delamination of the coating. This requires undue maintenance and replacement with resultant increased cost and down time.

It would be desirable to have a charge electrode assembly that would not be subject to corrosion or deterioration when used in an ink jet printer.

SUMMARY OF THE INVENTION

An object of this invention is to provide a novel and improved charge electrode assembly that will realize increased longevity and reliability when used in an ink jet printer.

Another object of this invention is to provide a charge electrode that may be exposed to both anodic and cathodic current flow without dissolution, spalling or delamination.

According to this invention, a charge electrode assembly for use in an ink jet apparatus is formed with grooves in a nonconductive support or housing. The surfaces of the grooves are coated with a conductive layer of a noble material, such as platinum or rhodium, to form discrete uniformly spaced charge electrodes. A direct current (DC) power supply is connected to the charge electrodes for selectively applying an electric potential to the electrodes as ink droplets traverse the electrode areas. The charge electrodes that employ a single material of a corrosion-resistant noble metal as the conductive element have been found to be resistant to degradation by the continuous impingement of highly pressurized ink jet streams or electrochemical attack and are able to maintain their conductivity without deleterious effects.

BRIEF DESCRIPTION OF THE DRAWING

The invention will be described in greater detail with reference to the drawing in which.

Similar numerals refer to similar parts throughout the drawing.

DESCRIPTION OF THE PREFERRED EMBODIMENTS

Figure 1:
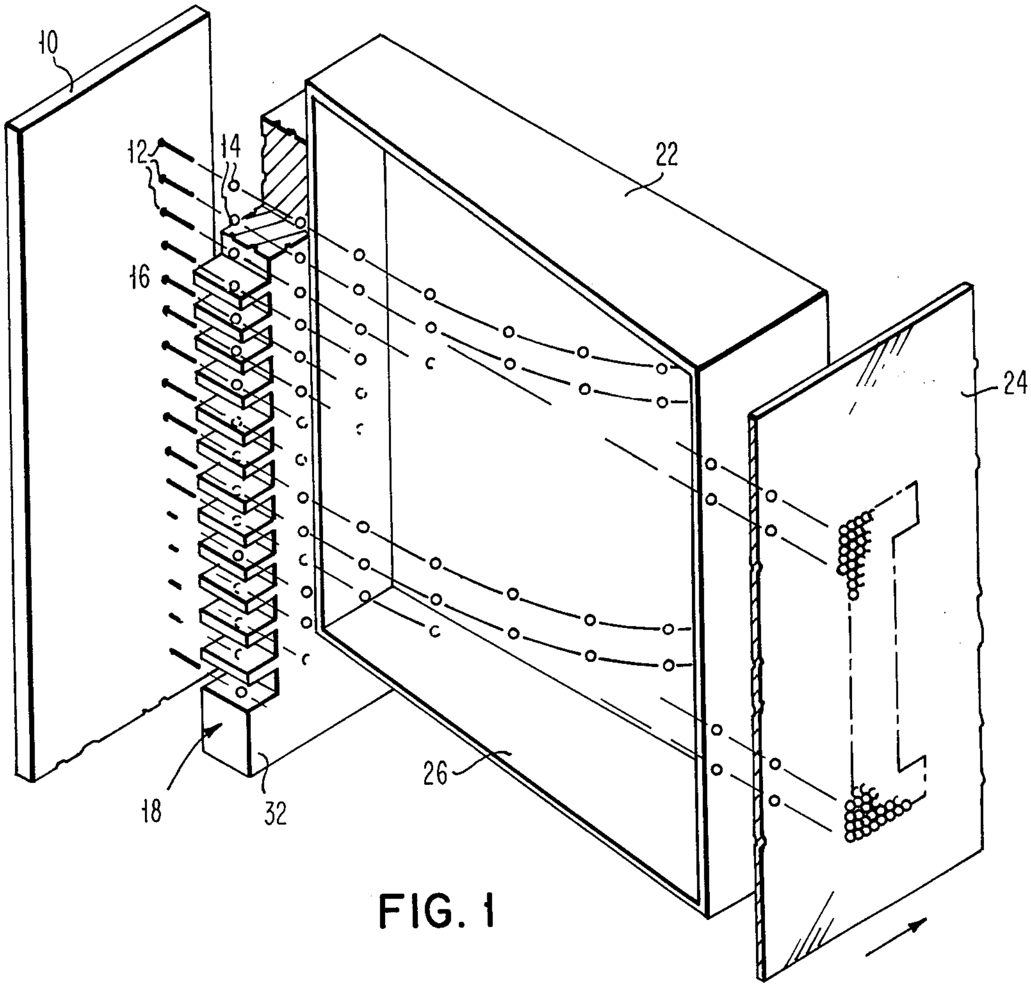
FIG. 1 is a three dimensional representation of an ink jet apparatus, including charge electrodes used in accordance with this invention.

With reference to FIG. 1, an ink jet printer comprises a nozzle plate 10 having a multiplicity of nozzle elements 12 through which a pressurized electrically conductive jet of ink is propelled. The ink jet is vibrated, by piezoelectric means for example, so that each continuous jet of ink that is passed through each nozzle element is separated into a series of discrete droplets 14 which are uniform in dimension and spacing.

A plurality of charge electrodes 16 formed on a charge plate 18 are interposed in the paths of the streams of the conductive ink droplets. In operation, a potential is selectively applied from a controlled power supply 20 to the charge electrodes 16, so that the ink droplets in the electrical field emanated by the charge electrodes will be capacitively charged or not charged, according to the potential that is applied to the electrodes at the instant that a droplet passes through the area of the electrode.

The charged or uncharged droplets continue in their paths into an electric field generated by a deflection plate 22, which is connected preferably between a reference potential, such as ground, and a relatively high positive voltage source (not shown). The electric field established by the deflection plate 22 causes a slight deflection of those ink droplets that have a positive charge, so that these charged droplets will be deflected from the direction of travel and thus away from a target record medium 24. These deflected droplets are effectively removed from the stream of ink, and are gathered in a gutter 26, which may be formed with the deflection plate 22. In this way, the unused ink may be recaptured and recycled for use.

The uncharged droplets which have not been deflected continue in their path and impinge upon the record medium or paper 24. Relative movement between the impacting droplets and the paper results in the registration of intelligent data which will form the desired record.

Figures 2A, 2B:
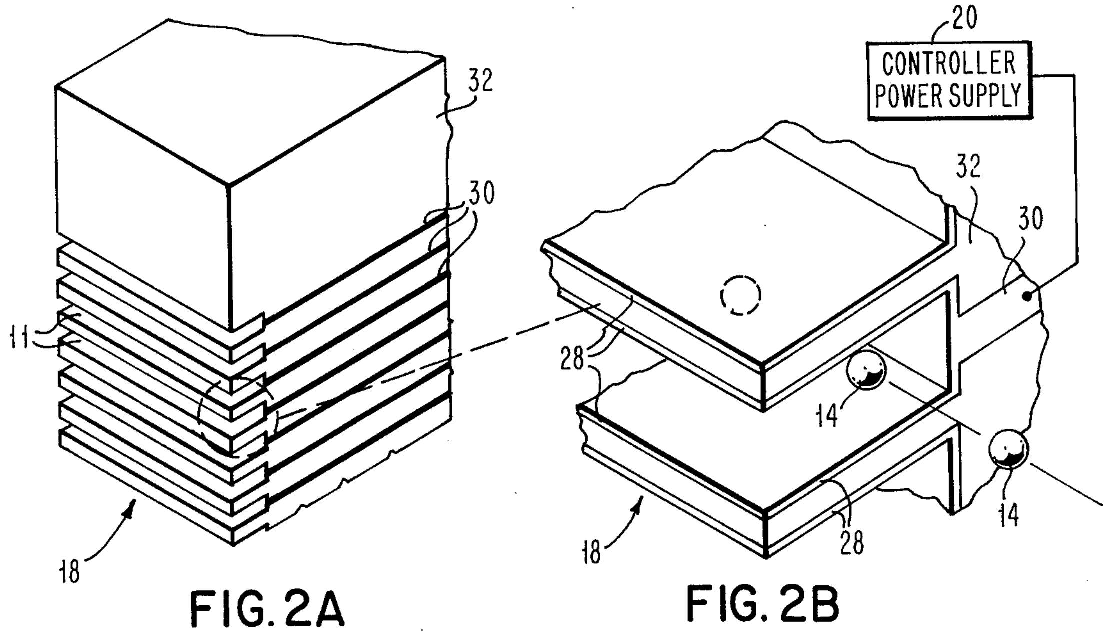
FIG. 2A is an enlarged sectional view of a group of charge electrodes, illustrated in FIG 1.
FIG. 2B is a sectional view of a portion of the arrangement of FIG. 2A and a partial block diagram respectively depicting the novel charge electrodes of this invention and the control power supply.

In accordance with this invention as depicted in FIGS. 2A and 2B, the charge electrodes 16 are formed as uniformly spaced grooves 11 in the charge plate 18, which may be made from a nonconductive ceramic, by way of example. Within each groove, 11, a conductive layer 28 of a noble metal, such as platinum or rhodium is deposited. The conductive layer 28 may be deposited by sputtering techniques and may be about 1000Å thick, for example. Each groove 11 may be 0.3mm wide, 1.5mm long, and 0.500mm deep. The charge electrode formed with the noble metal layer 28 is connected to a conductive strip 30 formed on the nonconductive ceramic housing 32 of the charge plate structure 18. A potential of predetermined magnitude that is provided by the controlled power supply 20 is passed through the conductive lead 30 to selected ones of the charge electrodes 16. An example of a charge electrode structure employing conductive elements is disclosed in U.S. Pat. No. 3,975,741, entitled "Charge Electrode for Ink Jet", issued Aug. 17, 1976.

It has been found that the use of a passive noble metal, preferably platinum or rhodium, as the conductive layer of a charge electrode through which a stream of ink droplets is repeatedly passed, has enhanced the life and performance of the charge electrode.

It should be understood that although platinum and rhodium have been designated as the preferred noble metals for use in the charge electrode assembly of a multiple ink jet printer, the invention is not limited to only these two metals, but contemplates the use of other noble metals of the platinum family. Also, it should be noted that the scope of this invention is not limited to the specific configuration and dimensions set forth in the description of the preferred embodiment, but may be applied to ink jet printers which employ one or more charge electrodes subjected to impinging ink droplets.

What is claimed is:

1. A charge electrode assembly useful in an ink jet printer comprising:
   - a nonconductive ceramic housing;
   - a series of uniformly spaced grooves formed in said housing;
   - a layer of a corrosion-resistant non-oxidated noble metal applied directly in each of said grooves to said housing ceramic and insulated from each other, said non-oxidated metal being effectively resistant to dissolution that may be caused by anodic and cathodic current in the presence of pressure propelled ink droplets.

2. A charge electrode assembly as in claim 1, including conductive means coupled to each electrode, and further including control means for selectively applying an electric voltage to each electrode.

3. A charge electrode assembly as in claim 1, wherein said layer comprises a thin film of platinum or rhodium.

4. A charge electrode assembly as in claim 1, wherein said electrode layer comprises a film approximately 1000A in thickness.

5. A charge electrode assembly as in claim 1, wherein said layer is formed of a singular material.

6. A charge electrode assembly as in claim 5, wherein such metal is platinum.

7. A charge electrode assembly as in claim 5, wherein said metal is rhodium.

* * * * *